United States Patent
Benoliel

(10) Patent No.: US 8,827,011 B2
(45) Date of Patent: Sep. 9, 2014

(54) ROAD-BASED SUPPORT FOR ELECTRIC VEHICLES

(76) Inventor: Eli Benoliel, Zikhron-Yaakov (IL)

( * ) Notice: Subject to any disclaimer, the term of this patent is extended or adjusted under 35 U.S.C. 154(b) by 0 days.

(21) Appl. No.: 13/387,118

(22) PCT Filed: Jul. 27, 2010

(86) PCT No.: PCT/IL2010/000600
§ 371 (c)(1),
(2), (4) Date: Jan. 26, 2012

(87) PCT Pub. No.: WO2011/013124
PCT Pub. Date: Feb. 3, 2011

(65) Prior Publication Data
US 2012/0118693 A1  May 17, 2012

Related U.S. Application Data

(60) Provisional application No. 61/228,630, filed on Jul. 27, 2009.

(51) Int. Cl.
*A63G 25/00* (2006.01)

(52) U.S. Cl.
USPC ............... 180/2.1; 320/2; 320/108; 320/109

(58) Field of Classification Search
USPC ............ 191/6, 2, 3, 4, 8, 14, 15–19; 180/2.1
See application file for complete search history.

(56) References Cited

U.S. PATENT DOCUMENTS

| | | | | |
|---|---|---|---|---|
| 3,914,562 A | * | 10/1975 | Bolger | 191/10 |
| 4,139,071 A | * | 2/1979 | Tackett | 180/165 |
| 5,277,285 A | * | 1/1994 | Musachio | 191/6 |
| 5,821,728 A | * | 10/1998 | Schwind | 320/108 |
| 8,179,091 B2 | * | 5/2012 | Kissel, Jr. | 320/109 |
| 2011/0106349 A1 | * | 5/2011 | Sakita | 701/22 |
| 2012/0118693 A1 | * | 5/2012 | Benoliel | 191/22 C |

FOREIGN PATENT DOCUMENTS

| | | |
|---|---|---|
| CN | 1403316 | 3/2003 |
| CN | 2547047 | 4/2003 |
| CN | 1614855 | 5/2005 |
| CN | 100408372 | 7/2005 |
| CN | 101092114 | 12/2007 |
| CN | 101453106 | 6/2009 |
| CN | 101782145 | 7/2010 |
| DE | 2244392 | 3/1974 |
| EP | 0681939 | 11/1995 |

(Continued)

OTHER PUBLICATIONS

International Preliminary Report on Patentability Dated Feb. 9, 2012 From the International Bureau of WIPO Re.: Application No. PCT/IL2010/000600.

(Continued)

*Primary Examiner* — John Walters
*Assistant Examiner* — James Triggs

(57) ABSTRACT

A method of providing electrical power to road vehicles, comprises providing electrical power to a cable running along a length of a road; from said cable providing power to a distribution mechanism under said road; from said distribution mechanism connecting to switchable elements of a surface of said road, said switchable elements being distributed over said surface; and at each element switching on power when a vehicle is detected overhead and switching off power otherwise.

11 Claims, 3 Drawing Sheets

(56) References Cited

FOREIGN PATENT DOCUMENTS

| FR | 2696985 | 4/1994 |
|----|---------|--------|
| WO | WO 00/46065 | 8/2000 |
| WO | WO 2011/013124 | 2/2011 |

OTHER PUBLICATIONS

International Search Report and the Written Opinion Dated Oct. 27, 2011 From the International Searching Authority Re. Application No. PCT/IL2010/000600.

Notification of Office Action Dated Dec. 30, 2013 From the State Intellectual Property Office of the People's Republic of China Re. Application No. 201080043098.9 and Its Translation Into English.
Search Report Dated Dec. 30, 2013 From the State Intellectual Property Office of the People's Republic of China Re. Application No. 201080043098.9 and Its Translation Into English.
Notification of Office Action Dated May 22, 2014 from the State Intellectual Property Office of the People's Republic of China Re. Application No. 201080043098.9 and Its Translation Into English.
Search Report Dated May 22, 2014 from the State Intellectual Property Office of the People's Republic of China Re. Application No. 201080043098.9 and Its Translation Into English.

\* cited by examiner

ROAD-BASED SUPPORT FOR ELECTRIC VEHICLES

RELATED APPLICATIONS

This application is a National Phase of PCT Patent Application No. PCT/IL2010/000600 having International filing date of Jul. 27, 2010, which claims the benefit of priority of U.S. Provisional Patent Application No. 61/228,630filed on Jul. 27, 2009. The contents of the above applications are all incorporated herein by reference.

FIELD AND BACKGROUND OF THE INVENTION

The present invention relates to a device and method for road-based support for electric vehicles.

Due to considerations of pollution, greenhouse gases and depletion of stocks of fossil fuels, electric and hybrid electric vehicles are being considered ever more seriously. Nevertheless, fuel cell technology has not yet come of age and batteries are limited by their energy to weight ratio. Thus electric vehicles that can compete with fossil fuel driven vehicles in terms of performance and range are not yet available.

On the other hand, electric trains are an effective means of transportation, and have been around for many years. Electric trains solve the problem of energy storage by being fed by an overhead wire or an electrified rail.

However ground level electrification is not possible on roads since pedestrians use roads. Overhead wires have been used in urban transportation with trams and trolleybuses, but trams have to follow a defined track along the road and are vulnerable to vehicles breaking down or other blockages on the track which they have no way of getting around. Trolleybuses had a tendency to come adrift from their overhead wires and thus neither solution is satisfactory.

SUMMARY OF THE INVENTION

The present embodiments provide a pedestrian safe electricity supply for roads that does not restrict vehicles to a particular track. The present embodiments may assist with any kind of electric vehicle and are complementary to all current electric vehicle solutions.

According to one aspect of the present invention there is provided a matrix of individually switchable conductive elements built into a road surface.

In an embodiment, elements of said matrix are configured with a vehicle detector and a switch governed by the vehicle detector, thereby to electrify said conductive element only when a vehicle is directly overhead to pick up electricity.

In an embodiment, respective switches are configured with substantially a millisecond of switching reaction time.

In an embodiment, elements are connected via under road connectors to a transformer.

In an embodiment, the vehicle detector is further configured with an identification unit for identifying the vehicle, thereby to electrify a respective element only in the presence of an identified vehicle.

In an embodiment, the identification unit is configured to report vehicle identifications to a billing unit for billing a vehicle user.

In an embodiment, said elements comprise foils.

In an embodiment, the distribution system comprising a main cable running parallel with the longitudinal axis of the road, step down transformers at predetermined intervals along the main cable and feeder cables running from said transformers to said elements.

The distribution system may be configured to appear as a voltage limited current source to a load drawing from said elements.

According to a second aspect of the present invention there is provided a method of surfacing a road to render said road surface suitable for powering electrical vehicles, the method comprising:

laying a relatively high voltage cable along a length of said road;

providing step-down transformers at predetermined distances along said cable;

placing individually switchable conductive elements into said road surface;

connecting said individually switchable conductive elements to said step-down transformers.

According to a third aspect of the present invention there is provided a method of providing electrical power to road vehicles, comprising:

providing electrical power to a cable running along a length of a road;

from said cable providing power to a distribution mechanism under said road;

from said distribution mechanism connecting to switchable elements of a surface of said road, said switchable elements being distributed over said surface;

at each element switching on power when a vehicle is detected overhead and switching off power otherwise.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a nonvolatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
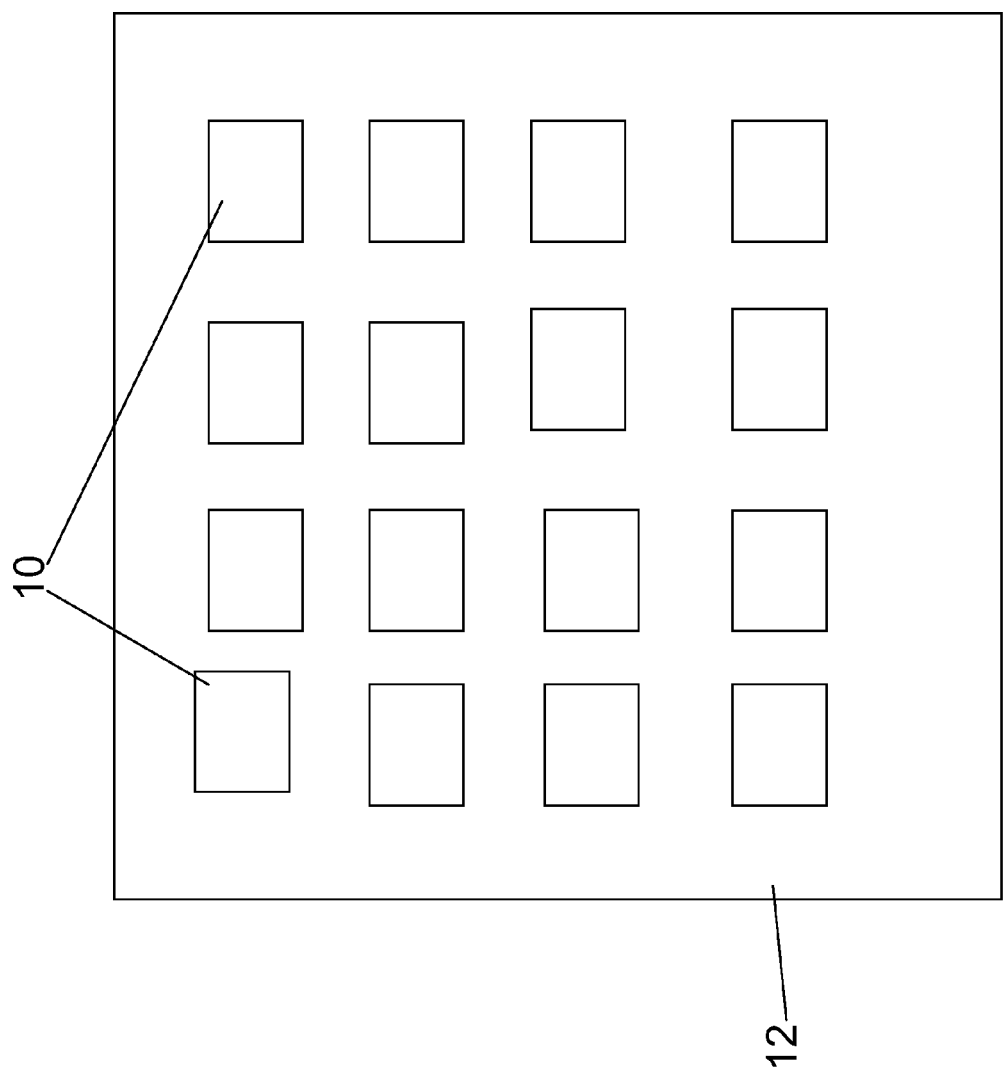
FIG. 1 is a simplified diagram illustrating a matrix of switchable elements in a road surface according to the present embodiments.

The present embodiments comprise a matrix of power pickup points distributed over a road surface which are dynamically switchable to be electrified when a vehicle is overhead to pick up power and to be off at other times.

The pickup points may be thin strips, comprising a foil surface backed by an insulator, and connected via a switch to a sub-surface power distribution system.

Power may be provided to any vehicle capable of picking up and making use of the electrical power. The system may conveniently be provided for busy urban roads, allowing electric vehicles to supplement or even recharge their batteries.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1 which illustrates a matrix of individually switchable conductive elements 10 built into a road surface 12.

Figure 2:
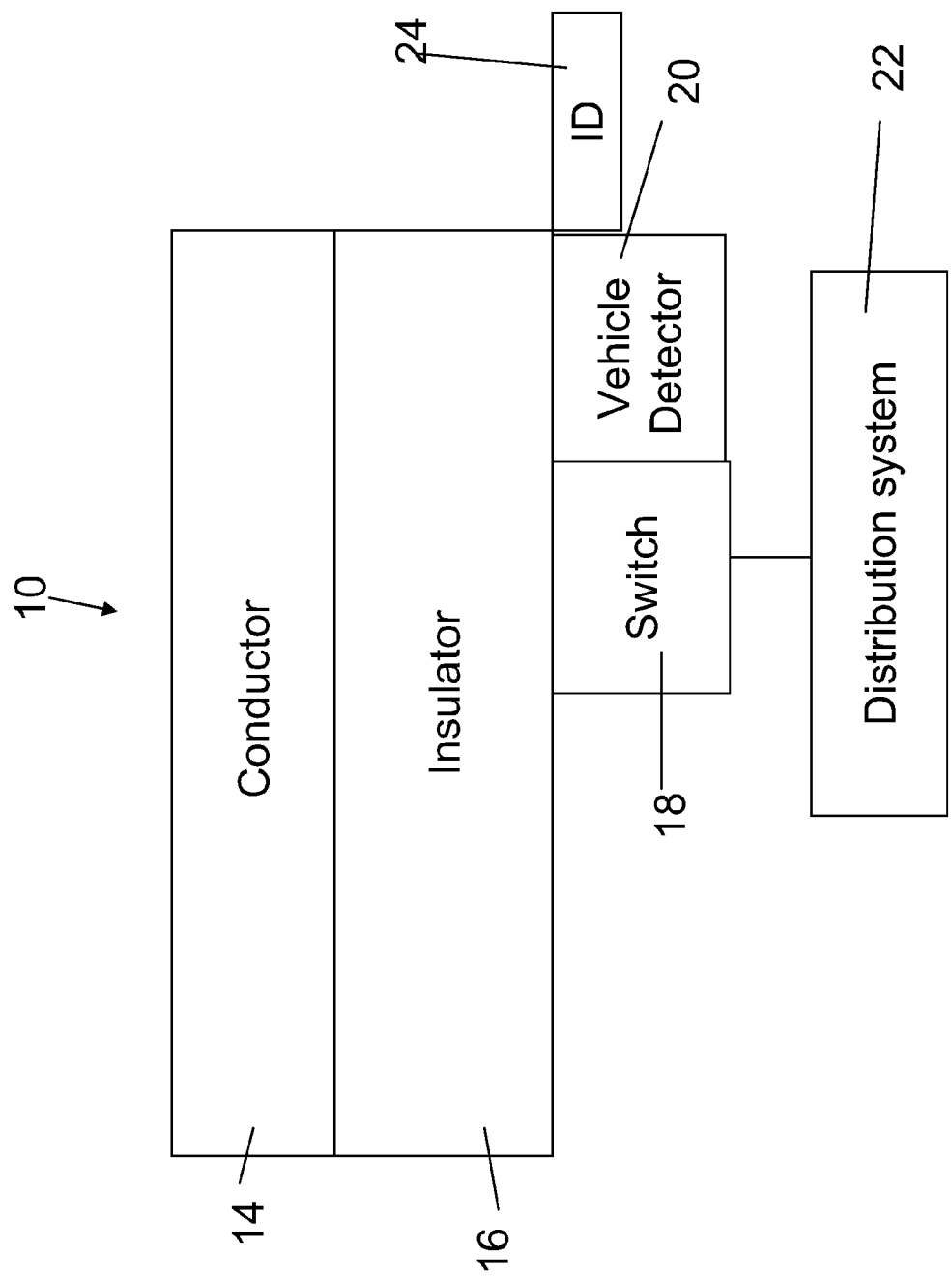
FIG. 2 is a transverse cross section of a single switchable element of the device of FIG. 1.

An example of an individual element 10 is shown in greater detail in cross section in FIG. 2. A conductive surface or foil 14 is embedded into the road surface, to be available to pick up shoes and the like of electric vehicles immediately overhead. The surface is insulated by insulating layer 16 and connected through the insulating layer to switch 18. Switch 18 switches on the conductor 14 and allows it to power passing vehicles. The switch 18 is connected to vehicle detector 20 which operates the switch. The vehicle detector sets the switch to on to electrify the conductor when it detects that a vehicle is directly overhead to pick up electricity. Thus the switch is off whenever there is no vehicle overhead and the element is safe for pedestrians to walk over. The switch may be a solid state switch and may be provided with a switching reaction time in the order of milliseconds.

The vehicle detector may include an identification unit 24 for identifying the vehicle that is currently overhead. The vehicle may itself carry a corresponding identification tag. The switch 18 may thus be controlled to electrify a respective element only in the presence of an identified vehicle, which can later be billed. Technology for automatic vehicle identification is currently used for collecting tolls on toll roads.

Vehicle identifications made by the vehicle detection unit may be reported to a billing unit for billing the vehicle user. The identification unit may be combined with an ammeter to charge for actual current used.

Figure 3:
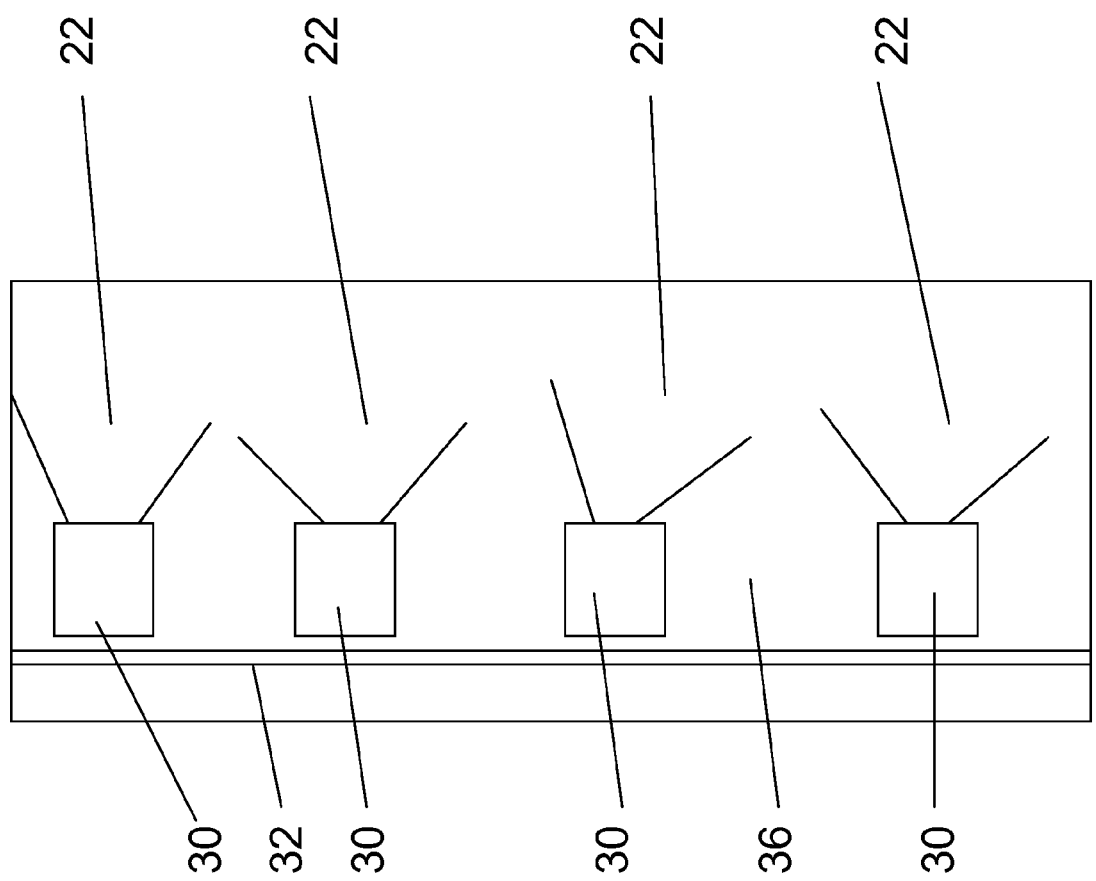
FIG. 3 is a view from above of an electrical distribution system for feeding the matrix of FIG. 1.

Reference is now made to FIG. 3 which is a schematic view of the road layout from above and showing an underground distribution system.

The elements may be connected via distribution system 22 of under road connectors to transformers 30 which take power from a high voltage cable 32. The cable 34 may be run along the length of road 36, typically under the surface. The main cable 36 may have step down transformers 30 at predetermined intervals along the main cable and the transformers feed cables of the distribution system running from the transformers to the elements.

The distribution system may be configured to appear to a load as a voltage limited current source. Thus vehicles are able to take the current they require.

The system of the above embodiments may be provided as part of a road-construction or surfacing operation. A process of surfacing a road to render the road surface suitable for powering electrical vehicles may involve laying a relatively high voltage cable 32 along a length 36 of the road, then providing step-down transformers 30 at suitable distances along the cable. The road surface is then constructed with the individually switchable conductive elements 10 embedded into the road surface so that the conductive surfaces are flush with the road surface. The individually switchable conductive elements are connected to the step-down transformers.

The matrix may then be used for providing electrical power to road vehicles that have an electrical pick-up capability. Power is provided to the cable 32 running along a length 36 of the road. From the cable, power is provided to the distribution mechanism 22 under the road. The distribution mechanism 22 provides power to the switchable elements 10 distributed over the road surface. Then each element switches on power when a vehicle is detected overhead and switches off power otherwise.

The system is suitable for busy roads, especially busy urban roads, and allows electrical vehicles to supplement their batteries on such main roads and even recharge. Thus battery power can be reserved for minor roads, greatly increasing the effective range of the electric vehicle.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A matrix of individually switchable conductive elements built into a road surface, each element comprising a conductive surface embedded in said road surface and available to make electrical contact connections with electrical pickup contacts of overpassing vehicles, each element of said matrix being configured with a vehicle detector and a switch governed by the vehicle detector, said switch and said vehicle detector being configured together to electrify said conductive element upon detecting a vehicle directly overhead to pick up electricity and to switch off said conductive element when detecting that no vehicle is directly overhead.

2. The matrix of claim 1, wherein said vehicle detector and said switch governed by the vehicle detector being configured to electrify said conductive element only when said vehicle is directly overhead.

3. The matrix of claim 1, wherein respective switches are configured with substantially a millisecond of switching reaction time.

4. The matrix of claim 1, wherein said elements are connected via under road connectors to a transformer.

5. The matrix of claim 1, wherein said vehicle detector is further configured with an identification unit for identifying the vehicle, thereby to electrify a respective element only in the presence of an identified vehicle.

6. The matrix of claim 5, wherein said identification unit is configured to report vehicle identifications to a billing unit for billing a vehicle user.

7. The matrix of claim 1, wherein said conductive surfaces comprise foils.

8. A distribution system comprising the matrix of claim 1, the distribution system further comprising a main cable running parallel with the longitudinal axis of the road, step down transformers at predetermined intervals along the main cable and feeder cables running from said transformers to said elements.

9. The distribution system of claim 8, configured as a voltage limited current source to a load drawing from said elements.

10. A method of surfacing a road to render said road surface suitable for powering electrical vehicles, the method comprising:
    laying a relatively high voltage cable along a length of said road;
    providing step-down transformers at predetermined distances along said cable;
    placing individually switchable conductive elements into said road surface, said placing being such as to render said conductive elements available to make electrical contact connections with electrical pickup contacts of overpassing vehicles;
    connecting said individually switchable conductive elements to said step-down transformers; and
    individually switching said individually switchable conductive elements to electrify respective conductive elements upon detecting a vehicle directly overhead of said respective switchable conductive element to pick up electricity.

11. A method of providing electrical power to road vehicles, comprising:
    providing electrical power to a cable running along a length of a road;
    from said cable providing power to a distribution mechanism under said road;
    from said distribution mechanism connecting to switchable elements of a surface of said road, said switchable elements being distributed over said surface so that conductive elements of said switchable elements are flush with said road surface;
    at each element switching on power when a vehicle is detected overhead and switching off power otherwise.

* * * * *